United States Patent
Martini

(10) Patent No.: US 6,607,664 B2
(45) Date of Patent: Aug. 19, 2003

(54) APPARATUS FOR TREATING A USED WIPING SOLUTION

(75) Inventor: Giacomo Martini, Cormano (IT)

(73) Assignee: De la Rue Giori S.A., Lausanne (CH)

( * ) Notice: Subject to any disclaimer, the term of this patent is extended or adjusted under 35 U.S.C. 154(b) by 0 days.

(21) Appl. No.: 10/255,260

(22) Filed: Sep. 26, 2002

(65) Prior Publication Data

US 2003/0029805 A1 Feb. 13, 2003

Related U.S. Application Data

(62) Division of application No. 09/219,746, filed on Dec. 22, 1998, now Pat. No. 6,485,653.

(30) Foreign Application Priority Data

Dec. 31, 1997 (IT) .......................................... MI97A2906

(51) Int. Cl.$^7$ ................................................ C02F 9/00
(52) U.S. Cl. ..................... 210/195.2; 210/196; 210/209; 210/532.1
(58) Field of Search ............................. 210/195.2, 196, 210/209, 532.1

(56) References Cited

U.S. PATENT DOCUMENTS

| | | | | |
|---|---|---|---|---|
| 4,293,416 A | * | 10/1981 | Keoteklian | 210/208 |
| 4,938,876 A | * | 7/1990 | Ohsol | 210/708 |
| 4,966,628 A | * | 10/1990 | Amon et al. | 524/555 |
| 5,200,094 A | * | 4/1993 | Hill et al. | 210/768 |
| 5,390,598 A | * | 2/1995 | Stauffer | 101/167 |
| 5,456,829 A | * | 10/1995 | Brown | 210/194 |
| 5,855,787 A | * | 1/1999 | Giori | 210/651 |

FOREIGN PATENT DOCUMENTS

| | | | |
|---|---|---|---|
| EP | 0 636 401 | * | 2/1995 |
| WO | WO 93 02967 | * | 2/1993 |

* cited by examiner

Primary Examiner—Chester T. Barry
(74) Attorney, Agent, or Firm—Pitney, Hardin, Kipp & Szuch LLP

(57) ABSTRACT

The process is composed of the following steps: (a) production of the fresh wiping solution, (b) introduction of the fresh wiping solution into one or more wiping tanks, where it is contaminated by the inks. In addition, it comprises the following steps: (c) treatment of the used solution exiting from the wiping tank or tanks with a chemical agent, producing a solution and sedimented ink, (d) separation by settling of the solution obtained in step (c), producing a clean solution and a concentrated solution with sedimented ink, (e) filtration of the concentrated solution, producing a clean solution and solid waste, and (f) use of the clean solution obtained in steps (d) and (e) as fresh wiping solution.

5 Claims, 3 Drawing Sheets

APPARATUS FOR TREATING A USED WIPING SOLUTION

This application is a divisional application of Ser. No. 09/219,746, filed Dec. 22, 1998, now U.S. Pat. No. 6,485,653.

FIELD OF THE INVENTION

The present invention relates to a process for producing a fresh wiping solution and for treating this wiping solution contaminated by the inks from one or more intaglio printing machines operating in a closed circuit and to an apparatus for carrying out this process.

PRIOR ART

In intaglio printing machines, the printing plates mounted on the plate cylinder, into which the designs are engraved, are wiped by rubbing with a wiping cylinder which rotates in the same direction as the plate cylinder and which removes the ink found outside the intaglio cuts of the plate. In order to clean the ink found on the wiping cylinder, the lower part of the latter is situated in a wiping tank, this tank being equipped, in addition, with brushes and doctor blades. A system of nozzles squirts fresh wiping solution onto the wiping cylinder and the fresh solution, once mixed with the ink, exits from the wiping tank as used solution.

By way of example, U.S. Pat. No. 5,390,598 discloses such a plant for the continuous cleaning of the wiping cylinder in an intaglio printing machine.

Novel inks have now been developed and the latter make it possible to employ a wiping process using a water-based solution which is much less environmentally harmful than the wiping solutions used previously. These novel inks used in the intaglio printing process are known, for example, from U.S. Pat. No. 4,966,628 and EP 0 340 163. Such inks comprise, inter alia, oleoresinous components and pigments. Water-based wiping solutions used in such intaglio printing machines with these novel inks are also known in the state of the art and these wiping solutions generally comprise at least 90% of water and additives.

One of these wiping solutions is disclosed in Patent DE 1 546 776 and is composed of an aqueous solution comprising 1 to 5% by weight of alkaline lye, 2 to 10% by weight of a commercial cleaning product comprising alkaline phosphate and 1 to 10% by weight of a wetting agent. More particularly, this aqueous solution comprises 1.5 to 2.5% by weight of caustic soda NaOH, 2 to 5% by weight of sodium phosphate $Na_3PO_4$ and 1 to 3% by weight of sulfonated castor oil.

Another of these wiping solutions is disclosed in U.S. Pat. No. 3,389,656 and is composed of an aqueous solution comprising approximately 1 to 5% by weight of a strong base, such as, for example, potassium hydroxide or sodium hydroxide or alternatively ammonium hydroxide, approximately 2 to 10% by weight of a detergent, for example sodium polyphosphate, and approximately 0.3 to 10% by weight of a wetting agent, such as sulfonated castor oil.

Novel inks which have appeared on the market recently have even rendered unnecessary the additives added to water in the wiping solutions described above. Thus, the wiping solution can even be composed solely of softened water.

A process for producing fresh wiping solution and for treating used wiping solution known in the prior art comprises the following steps:

a) production of fresh wiping solution,
b) introduction of the fresh wiping solution into one or more wiping tanks and contamination by the inks,
c) ultrafiltration of the used solution coming from the wiping tank or tanks, producing a clear solution and a concentrated residual solution,
d) recycling the clear solution into the fresh wiping solution circuit,
e) flocculation of the concentrated residual solution resulting from the ultrafiltration,
f) filtration of the flocculated solution, giving solid residues and a solution,
g) neutralization of the filtered solution with acid,
h) reduction of the chemical oxygen demand of the neutralized solution, and
i) discharge to drain of the solution with the reduced chemical oxygen demand.

An example of such a process is given in block diagram form in FIG. 1.

The recycling capacity of this process after ultrafiltration is approximately 80%, this value depending in addition on the quality of the ink used and on its concentration in the wiping solution.

The major disadvantage of this process is that the treated residual solution conveyed to drain comprises a large amount of salts. These salts are mainly chlorides, originating from the flocculation and neutralization products, and sulfates, if sulfuric acid has been used for the neutralization. The presence of a large amount of chlorides and/or of sulfates, as well as the chemical oxygen demand, which can be greatly reduced but not entirely eliminated, presents problems in many countries.

In addition, depending on the number of machines used, the consumption of water and of flocculation products can be high and expensive.

The aim of the invention is to improve the known processes for the recycling of wiping solution.

SUMMARY OF THE INVENTION

The aim of the present invention is more particularly to produce a process, operating in a closed circuit, in which most of the wiping solution is recovered and no longer discharged to drain in the form of water after an appropriate treatment. The water consumption of the process can thus be greatly decreased and only solid waste will be obtained, which waste can subsequently be treated while observing environmental protection standards.

The invention also makes it possible to no longer use active charcoal, which corrected the chemical oxygen demand.

The present invention constitutes an improvement to the process and the apparatus which form the subject-matter of Swiss Patent Application No. 1996 2152/96, filed on behalf of the same Applicant, which has not yet been published.

The process for producing fresh wiping solution and for treating used wiping solution according to the invention is defined by the steps of claim 1. This process makes it possible to treat both wiping solutions composed solely of softened water and wiping solutions composed of softened water and of additives.

In particular, the process according to the invention for the treatment of used solution involves a chemical agent which separates the inks from the wiping solution in step (c). This chemical agent exhibits the advantage, on the one hand, of not modifying the physicochemical properties of the wiping solution and, on the other hand, of not increasing the volume of the solid residues. The chemical agent is formed by an organic copolymer which has the following properties:

relative density, 1.08–1.09 kg/dm$^3$ pH, approximately 7 molecular weight, approximately 500,000

Brookfield viscosity, 10,000 cPs.

The action of this chemical agent is similar to that of a conventional flocculent but, on the other hand, the wiping solution can be reused immediately after ultrafiltration, since its properties are not modified.

The chemical agent can optionally be mixed with an inorganic product which reacts on the potential of the ink molecules present in the solution, by destabilizing them.

The dependent claims 2 to 5 define specific embodiments of the process according to the invention.

The independent claim 6 defines an apparatus for the implementation of the process according to the invention.

The dependent claims 7 to 10 define specific embodiments of the apparatus for the implementation of the process.

BRIEF DESCRIPTION OF THE DRAWINGS

The present invention will be better understood by virtue of the description of an embodiment and drawings which accompany it.

The process according to the invention is first of all described with reference to FIG. 2.

DESCRIPTION OF THE PREFERRED EMBODIMENT(S)

In the case where the fresh wiping solution is composed of softened water and of additives, it contains the following components in the proportions shown:

softened water, 98.5% caustic soda NaOH, 1% sulfonated castor oil, 0.5%.

The wiping solution can optionally comprise, in addition, detergent.

In step (a) of the process, the fresh wiping solution is produced. Depending on the inks used, the wiping solution is composed solely of softened water or else of a mixture of softened water, of caustic soda and of sulfonated castor oil.

The fresh solution is introduced into one or more wiping tanks in step (b) of the process and it is contaminated by the inks.

The used wiping solution is subsequently transferred from the wiping tank or tanks into a first tank in order to be subjected to step (c) of the process, namely a chemical reaction with the chemical agent. This reaction results in a separation of ink in the used solution, thus producing a solution which comprises sedimented ink.

The solution comprising the sedimented ink is subsequently subjected to step (d) of the process, which is a separation by settling, making it possible to obtain, on the one hand, a clean solution and, on the other hand, a concentrated residual solution comprising the ink.

The concentrated residual solution and the sedimented ink are filtered in step (e) of the process. This filtration finally produces, on the one hand, solid waste and, on the other hand, a clean solution.

The clean solution resulting from step (d) and from step (e) of the process is subsequently subjected to an optional step (g) of mechanical filtration or ultrafiltration.

In the optional step (h), the concentration of caustic soda and of sulfonated castor oil in the clean solution which has optionally been ultrafiltered is corrected, if necessary, and the clean solution finally rejoins the fresh wiping solution line in step (f) of the process.

There are many advantages to the process according to the invention. In particular, the use of chemicals, such as calcium chloride, iron chloride, sulfuric acid or active charcoal, is eliminated.

As this process recycles virtually all the water of the wiping solution, the consumption of water taken from the mains is thus very low and will only be used to compensate for possible losses. The recycling process according to the invention has a yield of at least 90%.

Figure 1:
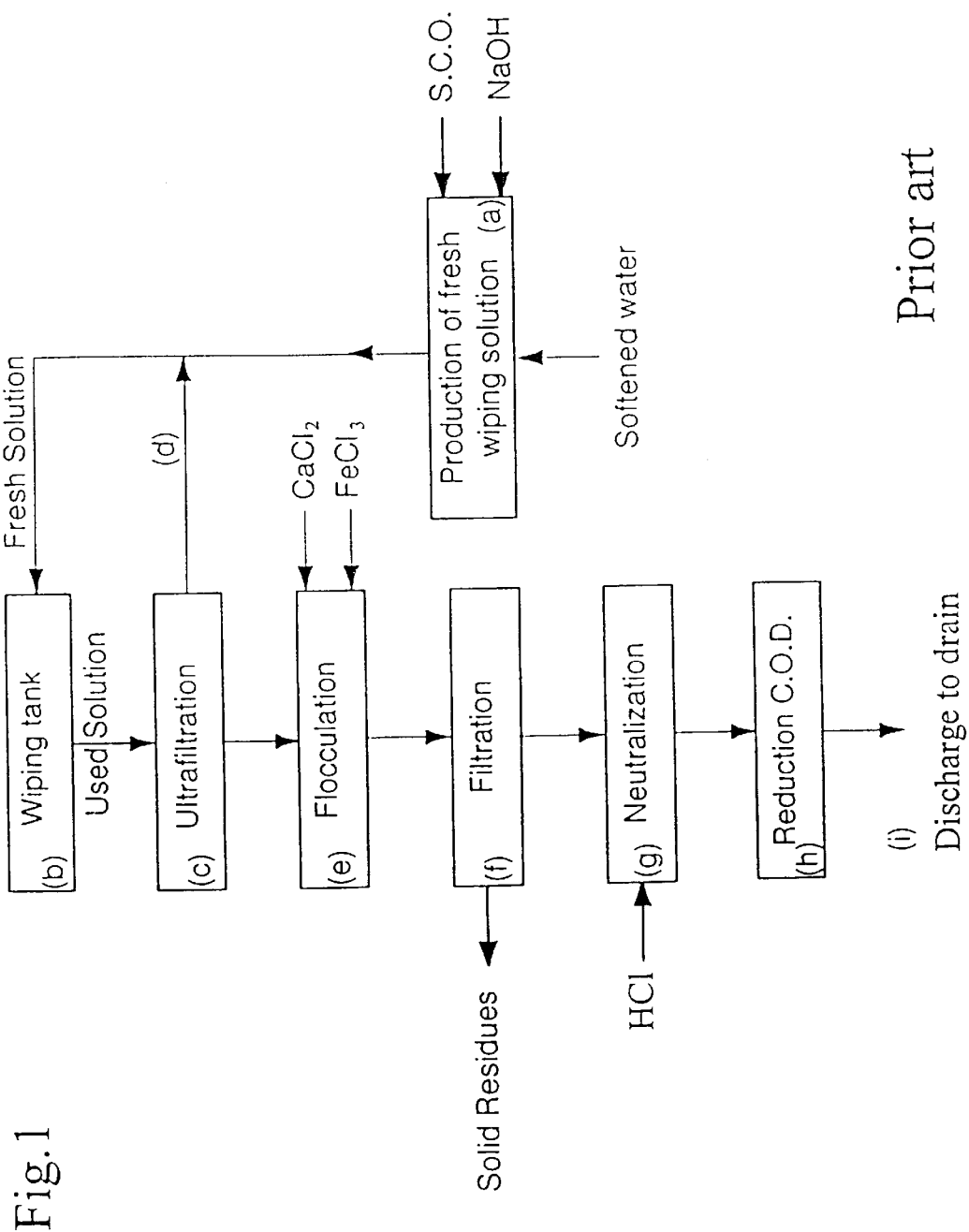
FIG. 1 is the block diagram of a process for treating wiping solution known in the state of the art.
Figure 2:
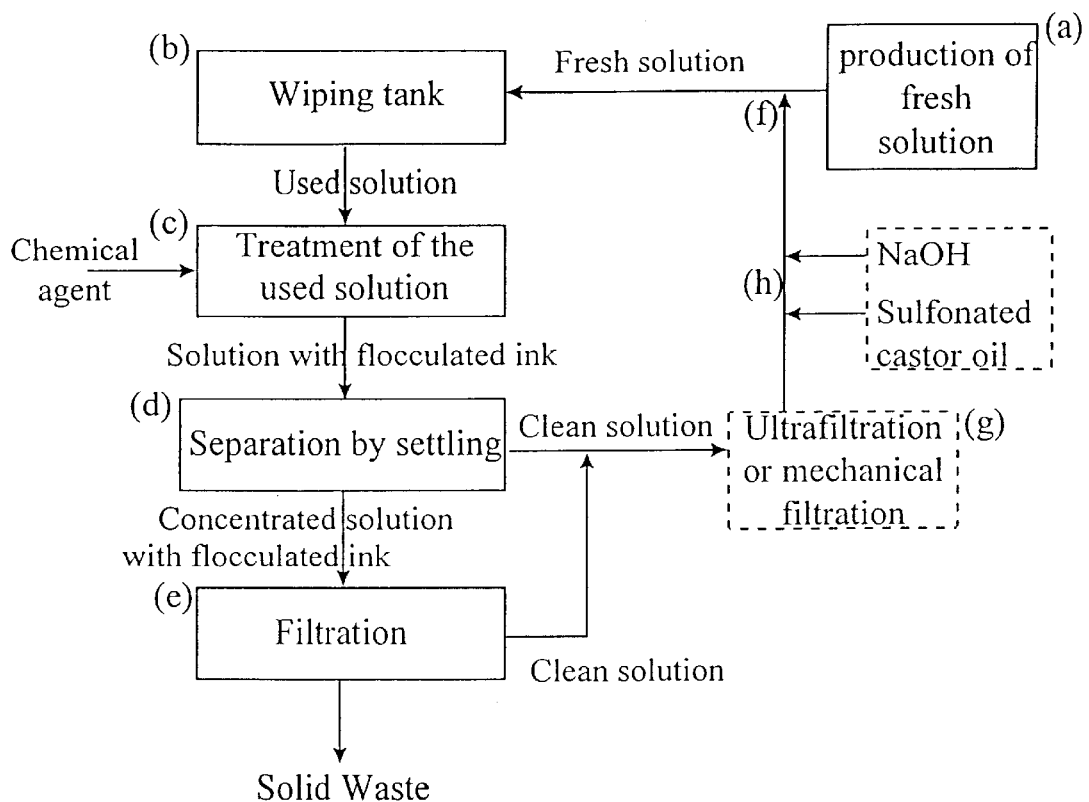
FIG. 2 is the block diagram of an embodiment of the process for recycling the wiping solution according to the invention.

Furthermore, on considering the arrow departing from the block diagram in FIG. 2, it is clearly observed that only solid residues are not reused in this process, whereas the liquid is held in a closed circuit.

Figure 3:
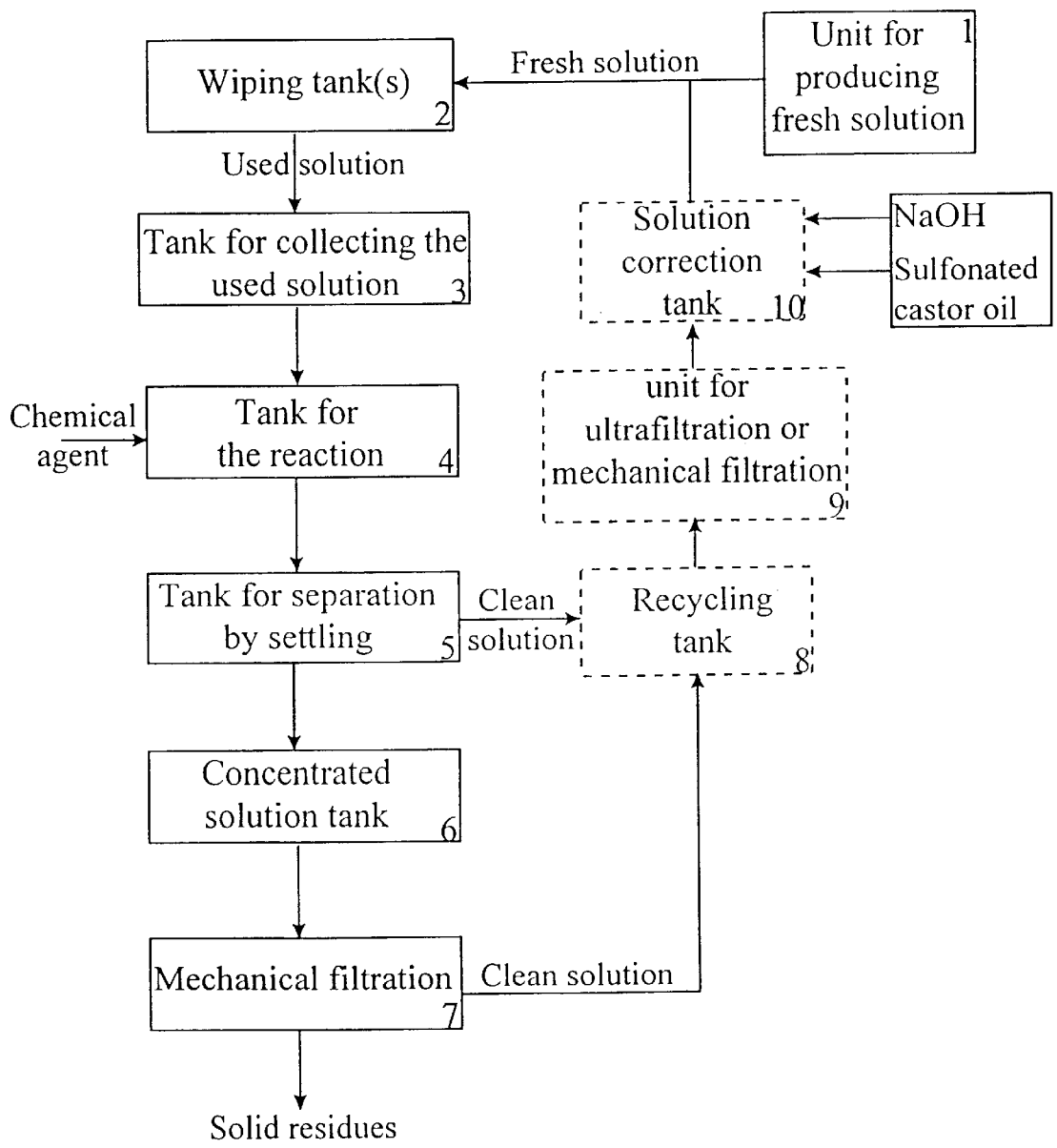
FIG. 3 is the block diagram of an embodiment of an apparatus for carrying out the process according to the invention.

FIG. 3 represents an example of an apparatus for carrying out the process according to the invention.

This apparatus comprises a unit 1 for producing fresh wiping solution in which the solution is prepared. The wiping solution is composed either of softened water alone or of softened water mixed with additives (caustic soda NaOH and sulfonated castor oil, as shown above). The fresh solution is subsequently conveyed to one or more wiping tank(s) 2 where it is contaminated by the inks. The used solution is subsequently collected in a first tank 3.

The used solution is decanted from the first tank 3 into a second tank 4, into which the chemical agent is also introduced. The chemical agent reacts with the used solution in this second tank 4, so as to produce a solution and sedimented ink.

This solution and the sedimented ink are decanted into a tank 5 for separation by settling, in which a clean solution and a concentrated solution comprising the ink are obtained.

The concentrated solution comprising the ink is first conveyed to a concentrated solution tank 6 and then to a mechanical filtration system 7, such as, for example, a filter press, from which solid residues, on the one hand, and a clean solution, on the other hand, are extracted.

The clean solution resulting from the tank 5 for separation by settling and the clean solution resulting from the filtration system 7 are recovered in an optional recycling tank 8. The clean solution subsequently leaves the recycling tank 8 in order to pass into a unit 9 for ultrafiltration or for mechanical filtration, which unit is optional, and from there into a third tank 10, in which the concentration of caustic soda and of sulfonated castor oil is corrected, if necessary.

Finally, from this third tank 10, the clean solution is reintroduced into the fresh solution line between the unit for production of fresh solution 1 and the wiping tank 2.

In the case where the wiping solution is composed solely of softened water, this third tank 10 can, of course, be dispensed with and the clean solution from the recycling tank 8 can be reintroduced directly into the fresh solution line.

Pumping means and pipework are used in order to transfer the solutions into the various tanks and units of the apparatus.

The embodiments described are given by way of example and variations in the scope of the claimed protection are possible. For example, the proportion of the components in the wiping solution can be varied slightly.

In addition, the filtration step can be carried out by a filter press or by another mechanical filtration method.

The composition of the chemical agent can also be varied according to the inks.

What is claimed is:

1. Apparatus for carrying out a process for producing a fresh wiping solution composed of at least softened water and for treating the wiping solution contaminated by the inks of one or more intaglio printing machines, said apparatus being composed of at least one unit for the production of fresh wiping solution (1) and at least one wiping tank (2), which receives the fresh wiping solution and in which the fresh solution is contaminated by the inks, and comprising a first tank for used wiping solution (3) collecting the solution from the wiping tank (2), a second tank (4) which receives the wiping solution from the first tank (3) and a chemical agent, in which the chemical agent reacts with the solution to produce a solution and sedimented ink, a tank for separation by settling (5) receiving the solution and the sedimented ink, a concentrated solution tank (6) connected to the tank for separation by settling (5) receiving the concentrated solution and the sedimented ink which result from the separation by settling, a filtration system (7) filtering the concentrated solution and the sedimented ink, a recycling tank (8) receiving the clean solution leaving the tank for separation by settling (5) and the clean solution resulting from the filter press (7), said recycling tank (8) being connected to the fresh wiping solution production line, and pumping and transfer means for transferring said solutions from one tank to another.

2. Apparatus as claimed in claim 1, comprising an ultrafiltration unit (9) which ultrafilters the clean solution resulting from the recycling tank (8).

3. Apparatus as claimed in claim 2, wherein the fresh wiping solution is composed of softened water, of sulfonated castor oil and of caustic soda NaOH, wherein there is present a third tank (10) in which the concentration of the additives in the clean solution is corrected, and wherein there is present means for adding the caustic soda NaOH and the sulfonated castor oil to the unit for producing fresh wiping solution (1) and to the solution correction tank (10).

4. Apparatus as claimed in claim 3, wherein the fresh wiping solution contains approximately 98.5% of softened water, approximately 1% of caustic soda NaOH and approximately 0.5% of sulfonated castor oil.

5. Apparatus as claimed in claim 1, wherein the chemical agent is a copolymer having the following characteristics:

relative density: 1.08–1.09 kg/dm$^3$ pH: approximately 7 molecular weight: approximately 500,000

Brookfield viscosity: approximately 10,000 cPs.

* * * * *